(12) United States Patent
Walls et al.

(10) Patent No.: US 10,962,630 B1
(45) Date of Patent: Mar. 30, 2021

(54) SYSTEM AND METHOD FOR CALIBRATING SENSORS OF A SENSOR SYSTEM

(71) Applicants: Toyota Research Institute, Inc., Los Altos, CA (US); The Regents of the University of Michigan, Ann Arbor, MI (US)

(72) Inventors: Jeffrey M. Walls, Ann Arbor, MI (US); Steven A. Parkison, Ann Arbor, MI (US); Ryan W. Wolcott, Ann Arbor, MI (US); Ryan M. Eustice, Ann Arbor, MI (US)

(73) Assignees: Toyota Research Institute, Inc., Los Altos, CA (US); The Regents of the University of Michigan, Arm Arbor, MI (US)

( * ) Notice: Subject to any disclaimer, the term of this patent is extended or adjusted under 35 U.S.C. 154(b) by 0 days.

(21) Appl. No.: 16/656,778

(22) Filed: Oct. 18, 2019

(51) Int. Cl.
 *G06T 7/80* (2017.01)
 *G01S 7/497* (2006.01)
 (Continued)

(52) U.S. Cl.
 CPC .......... *G01S 7/4972* (2013.01); *G01S 17/42* (2013.01); *G01S 17/86* (2020.01); *G06T 7/80* (2017.01)

(58) Field of Classification Search
 CPC ........ G01S 7/4972; G01S 17/86; G01S 17/42; G06T 7/80
 (Continued)

(56) References Cited

U.S. PATENT DOCUMENTS

2010/0209013 A1* 8/2010 Minear .................... G06T 7/32
 382/260
2015/0317781 A1* 11/2015 Napier .................... G01S 17/86
 348/46

(Continued)

OTHER PUBLICATIONS

Khosravian et al., "A Branch-and-Bound Algorithm for Checkerboard Extraction in Camera-Laser Calibration," geoarXiv:1704.00887v1 [cs.RO] Apr. 4, 2017.

(Continued)

*Primary Examiner* — Tung T Vo
(74) *Attorney, Agent, or Firm* — Christopher G. Darrow; Darrow Mustafa PC (57) ABSTRACT

A system and method for calibrating sensors may include one or more processors, a first sensor configured to obtain a two-dimensional image, a second sensor configured to obtain three-dimensional point cloud data, and a memory device. The memory device stores a data collection module and a calibration module. The data collection module has instructions that configure the one or more processors to obtain the two-dimensional image and the three-dimensional point cloud data. The calibration module has instructions that configure the one or more processors to determine and project a three-dimensional point cloud edge of the three-dimensional point cloud data onto the two-dimensional image edge, apply a branch-and-bound optimization algorithm to a plurality of rigid body transforms, determine a lowest cost transform of the plurality of rigid body transforms using the branch-and-bound optimization algorithm, and calibrate the first sensor with the second sensor using the lowest cost transform.

20 Claims, 5 Drawing Sheets

(51) Int. Cl.
*G01S 17/42* (2006.01)
*G01S 17/86* (2020.01)

(58) Field of Classification Search
USPC .................................................. 348/148
See application file for complete search history.

(56) References Cited

U.S. PATENT DOCUMENTS

| | | | |
|---|---|---|---|
| 2015/0317821 A1* | 11/2015 | Ding .................. | G06T 15/10 |
| | | | 345/420 |
| 2018/0130234 A1* | 5/2018 | Barker ................ | G06T 7/0006 |
| 2018/0189578 A1* | 7/2018 | Yang ................... | G01C 21/3638 |
| 2019/0026956 A1* | 1/2019 | Gausebeck ......... | G06T 7/579 |
| 2019/0120947 A1 | 4/2019 | Wheeler et al. | |
| 2019/0258899 A1* | 8/2019 | Coogan ............... | G06K 9/4652 |
| 2019/0259177 A1* | 8/2019 | Hoelscher .......... | G06K 9/00214 |
| 2019/0311546 A1* | 10/2019 | Tay ...................... | G01S 17/931 |
| 2019/0353975 A1* | 11/2019 | Didomenico ........ | G02B 3/14 |
| 2020/0090357 A1* | 3/2020 | Page-Caccia ....... | G06N 20/10 |
| 2020/0103920 A1* | 4/2020 | Castorena Martinez ................... | |
| | | | G05D 1/0276 |

OTHER PUBLICATIONS

Scaramuzza et al., "Extrinsic self calibration of a camera and a 3D laser range finder from natural scenes," IEEE/RSJ International Conference on Intelligent Robots and Systems, 9 pages (2007).

Zhang & Pless, "Extrnsic Calibration of a Camera and Laser Range Finder (Improves Camera Calibration)," 2004 IEEE/RSJ International conference on Intelligent Robots and Systems, 6 pages (2004).

Napier et al., "Cross-calibration of push-broom 2D LIDARs and cameras in natural scenes," 2013 IEEE International Conference on Robotics and Automation, 6 pages (2013).

Wang et al., "Automatic registration of mobile LiDAR and spherical panoramas," 2012 IEEE Computer Society Conference on Computer Vision and Pattern Recognition Workshops, 8 pages (2012).

* cited by examiner

SYSTEM AND METHOD FOR CALIBRATING SENSORS OF A SENSOR SYSTEM

TECHNICAL FIELD

The subject matter described herein relates, in general, to systems and methods for calibrating sensors of a sensor system and more particularly a sensor system having at least one camera and at least one light detection and ranging ("LIDAR") sensor.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some current vehicles utilize multiple sensors of varying types in an effort to detect objects external to the vehicle. Some of the sensors include one or more cameras that are capable of capturing two-dimensional images of the environment surrounding the vehicle. Other sensors include one or more LIDAR sensors that are capable of capturing three-dimensional point cloud data of the environment surrounding the vehicle.

In some cases, a field of view the two-dimensional images captured by the one or more cameras overlaps with the field-of-view of the three-dimensional point cloud data captured by the LIDAR sensors. This can be advantageous because the two-dimensional images captured by the one or more cameras can provide complementary sensing properties with the three-dimensional point cloud data captured by the LIDAR sensors. However, in order for these advantages to be more fully realized, a rigid body transform between the camera and the LIDAR sensor should be known in order to effectively perform geometric inferences on the information collected by the camera and the LIDAR sensor. A rigid transformation (also called an isometry) is a transformation of the plane that preserves length. Reflections, translations, rotations, and combinations of these three transformations are "rigid transformations" or "rigid body transformations."

SUMMARY

This section generally summarizes the disclosure and is not a comprehensive explanation of its full scope or all its features.

In one embodiment, a method for calibrating sensors comprised the steps of obtaining a two-dimensional image from a first sensor, obtaining three-dimensional point cloud data from a second sensor, determining a region of the two-dimensional image having a two-dimensional image edge, projecting a three-dimensional point cloud edge of the three-dimensional point cloud data onto the two-dimensional image edge, applying a branch-and-bound optimization algorithm to a plurality of rigid body transforms between the three-dimensional point cloud edge and the two-dimensional image edge, determining a lowest cost transform of the plurality of rigid body transforms using the branch-and-bound optimization algorithm, and calibrating the first sensor with the second sensor using the lowest cost transform.

In another embodiment, a sensor system may include one or more processors, a first sensor configured to obtain a two-dimensional image, a second sensor configured to obtain three-dimensional point cloud data, and a memory device. The first sensor, second sensor, and memory device are in communication with the one or more processors. The memory device stores a data collection module and a calibration module. The data collection module has instructions that configure the one or more processors to obtain a two-dimensional image from the first sensor and obtain three-dimensional point cloud data from a second sensor.

The calibration module has instructions that configure the one or more processors to determine a region of the two-dimensional image having a two-dimensional image edge, project a three-dimensional point cloud edge of the three-dimensional point cloud data onto the two-dimensional image edge, apply a branch-and-bound optimization algorithm to a plurality of rigid body transforms between the three-dimensional point cloud edge and the two-dimensional image edge, determine a lowest cost transform of the plurality of rigid body transforms using the branch-and-bound optimization algorithm, and calibrate the first sensor with the second sensor using the lowest cost transform.

In yet another embodiment, a non-transitory computer-readable medium for calibrating sensors and including instructions that when executed by one or more processors cause one or more processors to obtain a two-dimensional image from a first sensor, obtain three-dimensional point cloud data from a second sensor, determine a region of the two-dimensional image having a two-dimensional image edge, project a three-dimensional point cloud edge of the three-dimensional point cloud data onto the two-dimensional image edge, apply a branch-and-bound optimization algorithm to a plurality of rigid body transforms between the three-dimensional point cloud edge and the two-dimensional image edge, determine a lowest cost transform of the plurality of rigid body transforms using the branch-and-bound optimization algorithm, and calibrate the first sensor with the second sensor using the lowest cost transform.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is a system and method for calibrating sensors. The sensors may be a camera sensor and a LIDAR sensor that have at least partially overlapping field-of-view. The camera sensor may capture a two-dimensional image, while the LIDAR sensor may capture three-dimensional point cloud data. In order to properly calibrate the two-dimensional image with the three-dimensional point cloud data, the system and method determines an edge in the two-dimensional image. This edge of the two-dimensional image is then projected onto a corresponding three-dimensional edge of the three-dimensional point cloud data.

In order to determine the rigid body transformation between the two-dimensional image in a three-dimensional point cloud data, a branch and bound optimization algorithm is applied to several different rigid body transforms between the three-dimensional point cloud edge and the two-dimensional image edge. The lowest cost transform is then determined using the branch and bound optimization algorithm. Once the lowest cost transform is identified, this lowest cost transform will then be utilized to calibrate the camera with the LIDAR sensor.

Figure 1:
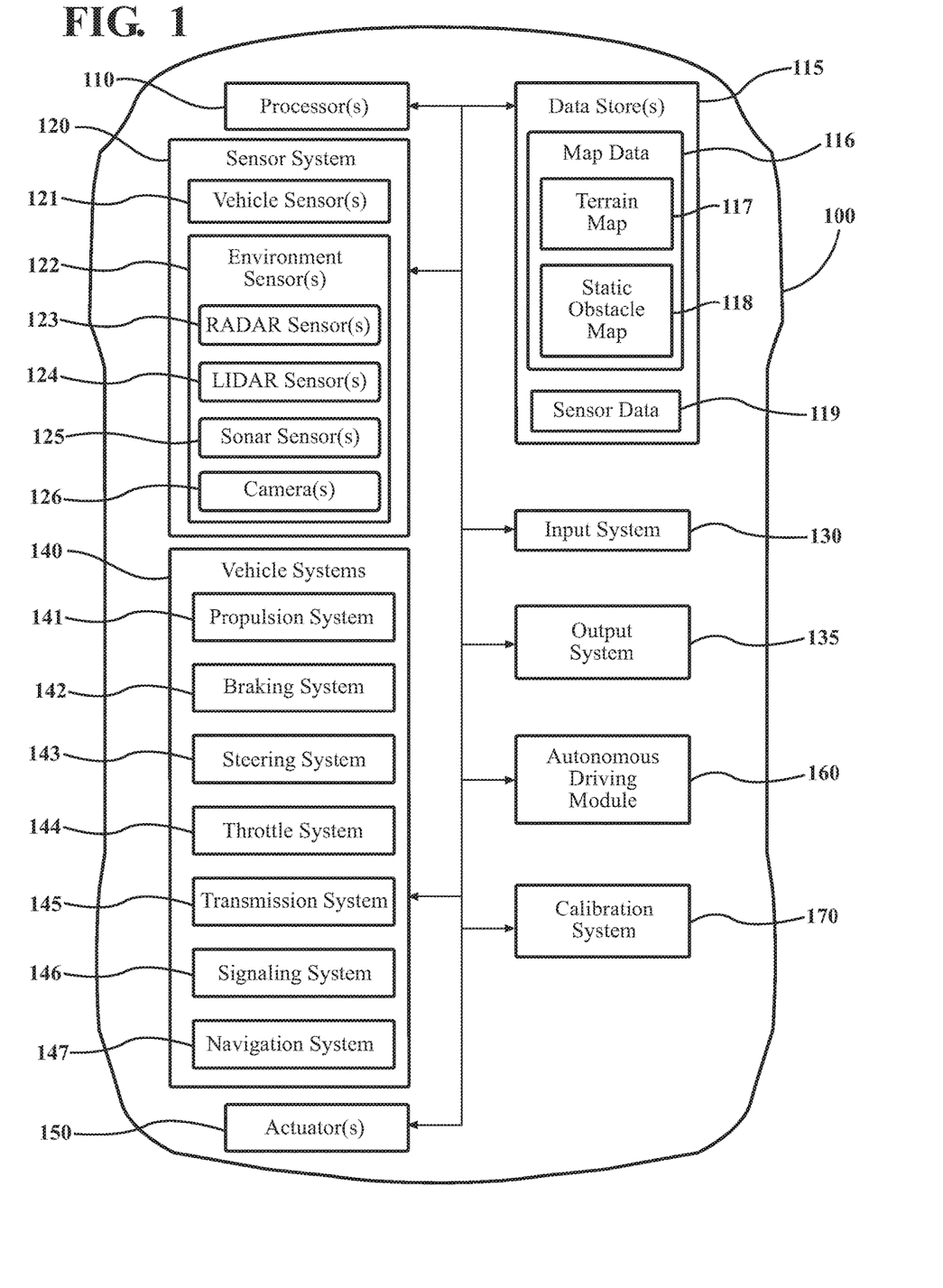
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation such as the levels defined by the Society of Automotive Engineers (SAE) (e.g., levels 0-5). As such, the autonomous system may provide semi-autonomous control or fully autonomous control, as discussed in relation to the autonomous driving module(s) 160.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

The vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include the vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the vehicle sensor(s) 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

In either case, the vehicle 100 includes a calibration system 170. The calibration system 170 has the ability to determine a rigid body transformation between two or more sensors that form the sensor system 120. In this example, the sensor systems could include the LIDAR sensor 124 and the camera 126. The LIDAR sensor 124 and the camera 126 may have at least a partially overlapping field-of-view. In order to perform effective geometric inference on the information collected from the LIDAR sensor 124 and the camera 126, a rigid body transform between the LIDAR sensor 124 in the camera 126 should be determined. The methodology utilized to determine the rigid body transform will be described later in this disclosure.

Figure 2:
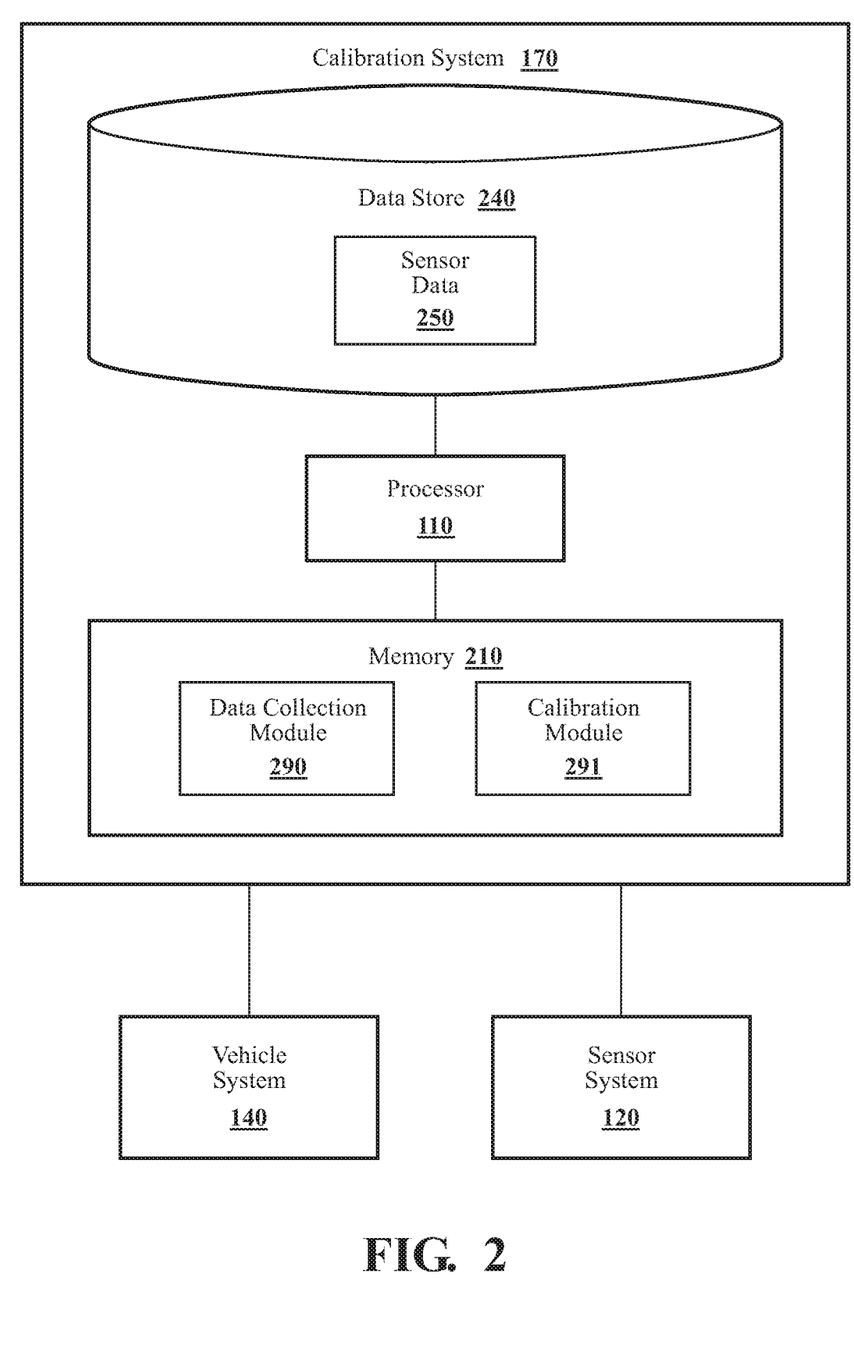
FIG. 2 illustrates one embodiment of a calibration system that is associated with calibrating sensors of a vehicle.

With reference to FIG. 2, one embodiment of the calibration system 170 is further illustrated. As shown, the calibration system 170 includes a processor(s) 110. Accordingly, the processor(s) 110 may be a part of the calibration system 170 or the calibration system 170 may access the processor(s) 110 through a data bus or another communication path. In one or more embodiments, the processor(s) 110 is an application-specific integrated circuit that is configured to implement functions associated with a data collection module 290 and a calibration module 291. In general, the processor(s) 110 is an electronic processor such as a microprocessor that is capable of performing various functions as described herein. In one embodiment, the calibration system 170 includes a memory 210 that stores the data collection module 290 and the calibration module 291. The memory 210 is a random-access memory (RAM), read-only memory (ROM), a hard disk drive, a flash memory, or other suitable memory for storing the modules 290 and 291. The modules 290 and 291 are, for example, computer-readable instructions that when executed by the processor(s) 110 cause the processor(s) 110 to perform the various functions disclosed herein.

Furthermore, in one embodiment, the calibration system 170 includes a data store 240. The data store 240 is, in one embodiment, an electronic data structure such as a database that is stored in the memory 210 or another memory and that is configured with routines that can be executed by the processor(s) 110 for analyzing stored data, providing stored data, organizing stored data, and so on. Thus, in one embodiment, the data store 240 stores data used by the modules 290 and 291 in executing various functions. In one embodiment, the data store 240 includes sensor data 250, along with, for example, other information that is used by the modules 290 and 291.

Accordingly, the data collection module 290 generally includes instructions that function to control the processor(s) 110 to obtain a two-dimensional image from the camera 126 and obtain three-dimensional point cloud data from the LIDAR sensor 124.

The calibration module 291 generally includes instructions that function to control the processor(s) 110 to determine a lowest cost transform of a plurality of rigid body transform using a branch and bound optimization algorithm. After the lowest cost transform is determined, this lowest cost transform is utilized to calibrate the camera 126 with the LIDAR sensor 124.

The calibration module 291 generally includes instructions that function to control the processor(s) 110 to determine a region of the two-dimensional image having a two-dimensional image edge and project a three-dimensional point cloud edge of the three-dimensional point cloud data onto the two-dimensional image edge. For example, referring to FIGS. 3A and 3B, these figures illustrate a two-dimensional image 300 and three-dimensional point cloud data 302. The two-dimensional image 300 includes a two-dimensional image edge 304, which in this example, is a lane marker for a road. However, it should be understood that the two-dimensional image edge 304 may be any type of edge found in a two-dimensional image. As such, other objects could serve as a two-dimensional image edge such as other vehicles, buildings, trees, structures, and the like. Similarly, the three-dimensional point cloud data 302 also includes a three-dimensional point cloud edge 306 that generally corresponds to the same road marker as the two-dimensional image edge 304.

The processor(s) 110, being configured by the calibration module 291, is able to project the three-dimensional point cloud edge 306 of the three-dimensional point cloud data 302 onto the two-dimensional image edge 304 of the two-dimensional image 300. By so doing, a projected image including portions of both the two-dimensional image 300 and the three-dimensional point cloud data 302 can be generated. An example, in shown in FIG. 3C, wherein the three-dimensional point cloud data 302 is overlaid onto the two-dimensional image 300. The rigid body transform that the calibration module 291 configures the processor(s) 110 to determine is referred to as $T \in SE(3)$. The LIDAR sensor 124 may actively illuminate the environment to detect a set of three-dimensional points and their associated surface reflectivity. For the equation $T \in SE(3)$, $\in$ is the symbol of a variable is in a set of numbers that follows the symbol. In this case, $\in$ means T is in SE(3) being the set of rigid body transformations in 3D. A three-dimensional point cloud, P, may be expressed as:

$$P = \{p_i\}_{i=1}^{N}, p_i \in \mathbb{R}^3 \times \mathbb{R}. \quad (1)$$

P refers to a point cloud having x, y, and z coordinates along with an intensity value. R represents a set of real numbers. The camera 126 may be configured to capture light reflected off the environment and may detect intensity along one or more rays. This may be expressed as:

$$I = \{i_i\}_{i=1}^{M}, i_i \in S^2 \times \mathbb{R} \quad (2)$$

Here, I represents the two-dimensional image. R represents a set of real numbers. The camera 126 and the LIDAR sensor 124 observe points in their own coordinated frame. To determine where a point would be observed by the other sensor, the SE(3) rigid body transformation between the coordinate frames ($T_{CL}$) is determined. Applying a rigid body transformation T to a point p may be defined as:

$$T \cdot p = Rp + t, R \in SO(3), t \in \mathbb{R}^3. \quad (3)$$

With the known transformation from the LIDAR reference frame to the camera reference frame, $T_{CL}$, one can compute the corresponding pixel using the projection function $\pi(p)=Kp/\|p_z I\|$, where K is the camera calibration matrix, and the indexing operator I(•)

$$i_j = I(\pi(T|_{CL} \cdot p_j)). \qquad (4)$$

This returns the pixel corresponding to that projected point. With the transformation between the LIDAR sensor 124 and the camera 126 coordinate frames $T_{CL}$, the projection function $\pi(\cdot)$, and the indexing operation I(•) one can determine correspondences between LIDAR points $p_j$ and image pixels $i_j$.

The processor(s) 110, being configured by the calibration module 291, is able to determine a lowest cost transform of the rigid body transforms using the branch-and-bound optimization algorithm and calibrate the camera 126 with the LIDAR sensor 124 using the lowest cost transform. The branch and bound search is an improvement over trying all possible transformations because it prunes the list of possibilities by finding a bound on their "cost". By so doing, if a transformation has no possibility to improve upon the current best score because of its bound, it is not evaluated.

To determine the lowest cost transform of the plurality of rigid body transforms, candidate transformations may be ranked. In one example, an edge-based cost function may be utilized to enforce spatially consistent "edginess" between the two-dimensional image obtained by the camera 126 and the three-dimensional point cloud data obtained by the LIDAR sensor 124. The edge-based cost function may be extended to maximize the probability of the point cloud edges, given the image edges, parameterized by the extrinsic calibration transformation. Assuming independent noise, the following may be utilized:

$$p(P_{edge} | I_{edge}; T) = \prod_{i=1} p(p_i^{edge} | I_{edge}; T). \qquad (5)$$

$I_{edge}$ is detected with a Sobel operator and $P_{edge}$ is detected with discontinuities in the depth and reflectivity of neighboring points. An example of the detected edges may be shown in FIGS. 3A and 3B, as edges 304 and 306, respectively.

To determine $p(p_i^{edge}|I_{edge}; T)$ one can determine the $p_i^{edge}$ corresponding to Equation 4, and $p(i_i^{edge})$ is determined by convolving the detected edges $I_{Edge}$ with a Gaussian kernel to account for sensor noise.

Edges detected in the point cloud may be from actual gradients in a scene being observed in the the images, or from spurious noise in the three-dimensional point cloud data. So that these outliers do not affect solution, the probability function:

$$p(p_i^{edge} | I_{edge}; T) = \exp(\pi(T(p_i^{edge}))) + (1-\alpha)U(p_i^{edge}), \qquad (6)$$

where u(•) is a uniform distribution over the range of the LIDAR sensor 124, and $\alpha$ is a Bernoulli parameter of the distribution that represents correct edges versus outliers. For numeric stability and to turn the product into a summation, the cost function as maximizing the log-likelihood of the probability distribution may be formulated as:

$$f(T; P_{edge}, I_{edge}) = \sum_{i=1} \log p(p_i^{edge} | I_{edge}; T). \qquad (7)$$

It should be understood that other cost functions may also be utilized. This is but one example that performs well and because edge-based cost functions admit a decomposition that can be leveraged when utilizing a branch and bound search that will be described in the paragraphs that follow.

A branch and bound search operates by iteratively evaluating a set of possible transformations. The branch and bound search may start with the full set of possible transformations and splits and bounds the intervals to find the globally optimal parameter. The bounds allow searching for the intervals that have a possibility to improve the current best parameter, reducing the number of evaluations that are needed.

In one example, to bound the likelihood of a point being an edge, as is needed in Equation 7, pixels u; v may be bounded to so that the point can correspond to for an interval of transformations. In one example, the bound the pixel values may be determined by finding the minimum and maximum points where $\pi'(\cdot)=0$ from Equation 4 and edges of the transformation interval {T}, or the critical points.

The cost function may be bounded by finding the pixel with the highest probability of corresponding to an edge from the range of possible pixels found in the previous subsection. Each image will receive many range queries while searched over the transformation interval. This falls under a range of problems known as Range Minimum Queries.

For this approach, a data structure called a sparse table, which allows for the computation of every possible query where the height and width is a power of two, called canonical ranges, may be utilized. This allows the minimum of four elements of the sparse table for any potential query to be found. This approach has O(c) query time and O(N M log N log M) preprocessing time and memory.

With the bounds provided by projecting the interval into the image, the calibration problem can be formulated as priority queue search where new intervals are added to the queue with their bounds as priorities. The approach described which nests branch and bound searches over translation and rotation, as opposed to the multiresolution approaches, which exhaustively search over rotations, may be utilized. The outer search over rotations passes the mean of the current interval to the translation search, which is used to provide a lower bound to limit the intervals that need to be evaluated. This nested strategy also allows for storing the rotated point clouds, so it does not need to be recomputed for the translation search.

In one example, two-dimensional images captured by the camera 126 and point clouds captured by the LIDAR sensor 124 are assembled into keyframes. To decide which keyframes to use, the vector $\phi_j$ that samples of the cost function at predetermined transformations is constructed. The mean of these vectors is found and the keyframe may be scored by finding the dot product of it with the mean vector, normalized by the length of the mean vector, or $$\kappa_i = \frac{\bar{\phi} \cdot \phi_j}{\|\bar{\phi}\|} \qquad (8)$$

and then use the keyframes with the highest values of Kj for calibration. As such, that mean cost surface will be peaked at the correct value, to allow for the discovery of keyframes with a high dot product with the mean to reduce the number of keyframes to evaluate.

As such, the calibration module 291 is able to determine by utilizing a branch and bound search the transformation with the lowest cost. After identifying the transformation with the lowest cost, this transformations is utilized to calibrate the two-dimensional images captured by the camera 126 with the three-dimensional point cloud data captured by the LIDAR sensor 124.

Figure 4:
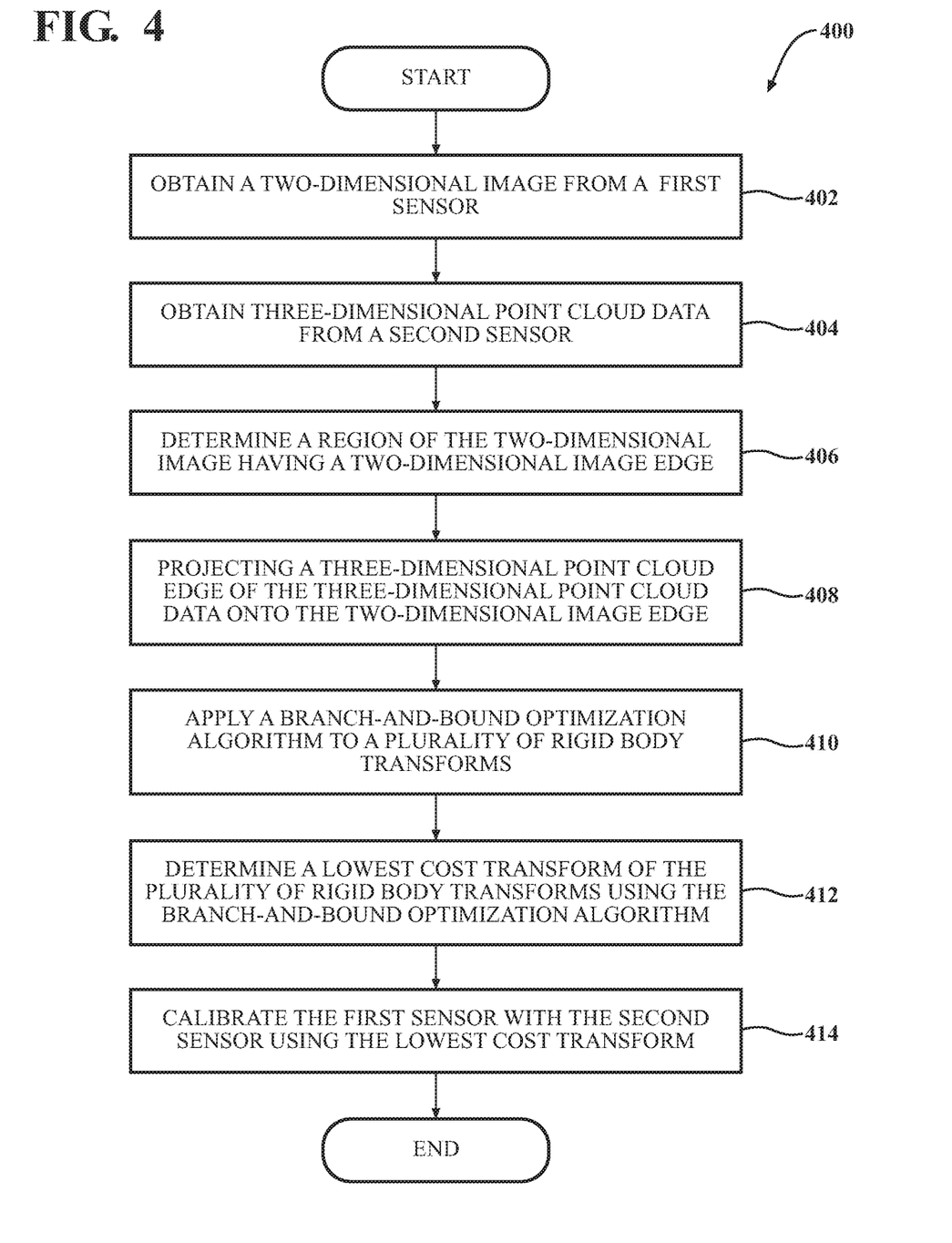
FIG. 4 illustrates one example of a method for calibrating sensors of a vehicle.

Referring to FIG. 4, a method 400 for calibrating sensors is shown. The method 400 will be described from the viewpoint of the vehicle 100 of FIG. 1 and the calibration system 170 of FIG. 2. However, it should be understood that this is just one example of implementing the method 400. While method 400 is discussed in combination with the calibration system 170, it should be appreciated that the method 400 is not limited to being implemented within the calibration system 170 but is instead one example of a system that may implement the method 400.

The method 400 begins at step 402, wherein the data collection module 290 causes the processor(s) 110 to obtain a two-dimensional image from a first sensor, such as camera 126. The two-dimensional image from the camera 126 may include more than one image. Furthermore, the two-dimensional image may be made up of one or more images captured from one or more cameras. In step 404, the data collection module 290 causes the processor(s) 110 to obtain three-dimensional point cloud data from a second sensor, which may be the LIDAR sensor 124. The three-dimensional point cloud data may be a set of data points in space.

In step 406, the calibration module 291 causes the processor(s) 110 to determine a region of the two-dimensional image having a two-dimensional image edge. Here, the two-dimensional image captured by the camera 126 may include one or more edges, such as the two-dimensional image edge 304 from the two-dimensional image 300 of FIG. 3A. As stated before, the two-dimensional image edge 304 may be derived from a road marking. However, it should be understood that the edge of the two-dimensional image to be generated based on the presence of structures, markings, or other objects. The two-dimensional edge may be determined by observing a color gradient, which generally indicates a change in colors in the two-dimensional image. In this example, the two-dimensional image edge 304 is a yellow lane marker against a dark gray roadway. There is a color gradient between the two-dimensional image edge 304 for in the roadway, which thus defines the edge.

Figure 3A:
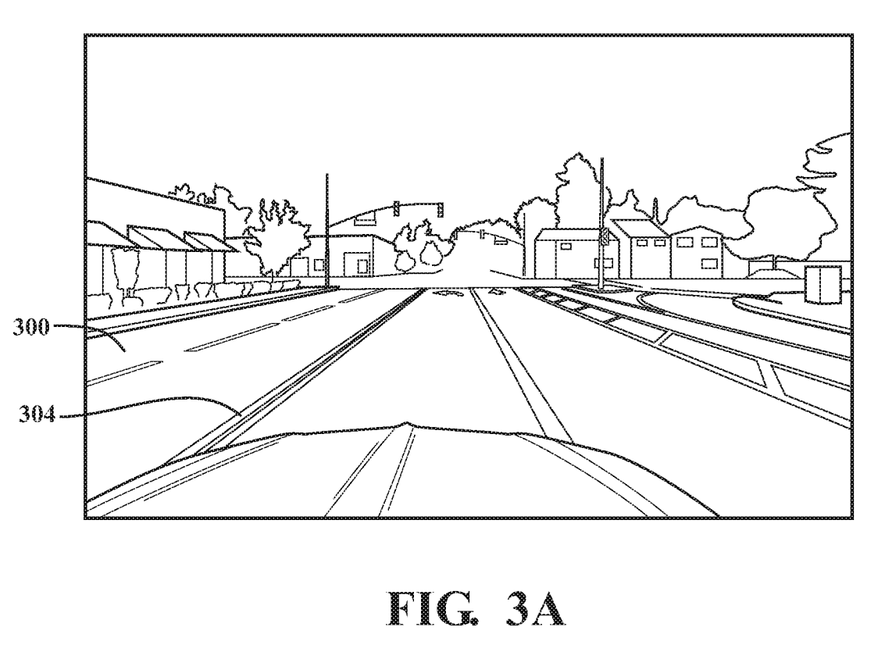
FIGS. 3A-3C illustrate a two-dimensional image captured by a camera, a three-dimensional point cloud data captured by a LIDAR sensor, and a projection of the three-dimensional point cloud onto the two-dimensional image, respectively.
Figure 3B:
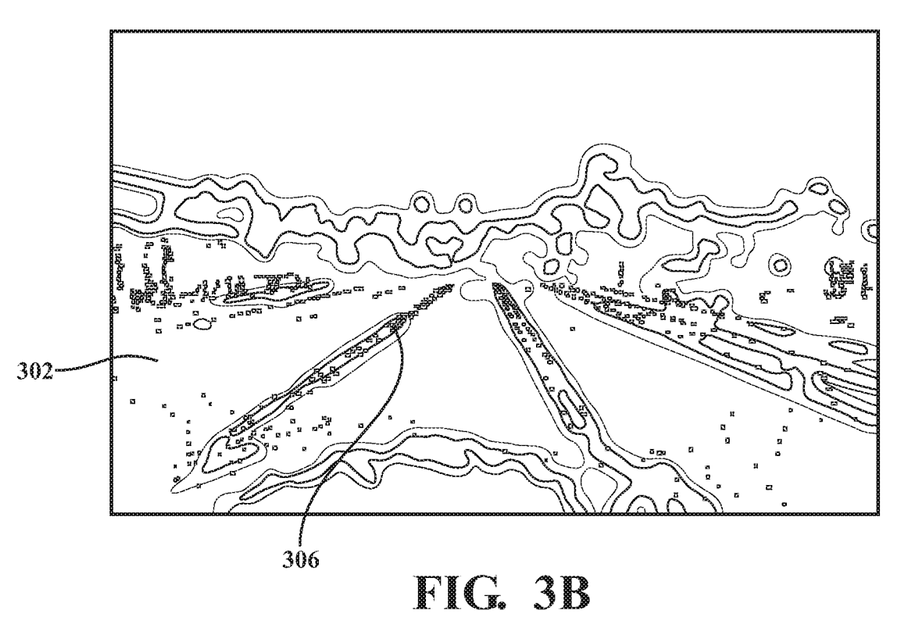
Figure 3C:
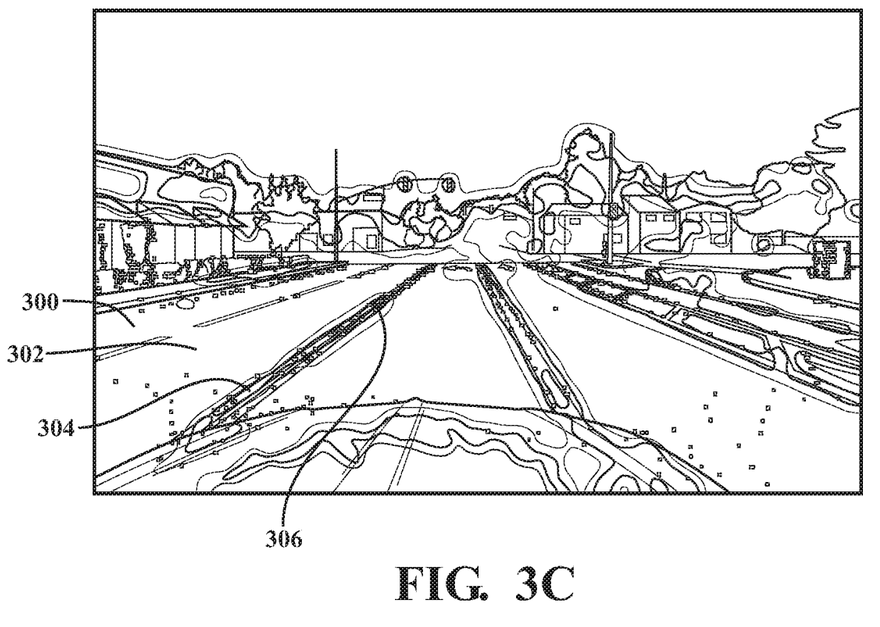

The three-dimensional data captured by the LIDAR sensor 124 may also include a three-dimensional edge, such as the three-dimensional point cloud edge 306 in the three-dimensional point cloud data 302 of FIG. 3B. The three-dimensional edge may be determined by utilizing an intensity gradient or a depth gradient.

In step 408, the calibration module 291 causes the processor(s) 110 to project the three-dimensional point cloud edge, such as three-dimensional point cloud edge 306 of FIG. 3B onto the two-dimensional edge, such as the two-dimensional image edge 304 of FIG. 3A. This essentially causes an overlay between the three-dimensional point cloud data 302 and the two-dimensional image 300.

In step 410, the calibration module 291 causes the processor(s) 110 to apply a branch and bound optimization algorithm to a plurality of rigid body transforms. This may be accomplished by bounding edge values of the two-dimensional image using a sparse data table to improve the performance of the algorithm. The branch and bound optimization algorithm was discussed in the previous paragraphs and the previous description is equally applicable to the method 400.

In step 412, the calibration module 291 causes the processor to determine a lowest-cost transform of the plurality of rigid body transform using the branch and bound optimization algorithm. Again, the branch and bound optimization algorithm was discussed in the previous paragraphs and the previous description is equally applicable to the method 400.

In step 414, the calibration module 291 causes the processor(s) 110 to calibrate the camera 126 with the LIDAR sensor 124 using the lowest-cost transform which effectively acts as the rigid body transform that describes the transformation between the information captured by the camera 126 and the LIDAR sensor 124.

FIG. 1 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route.

The vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the calibration system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140.

The processor(s) 110/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving module(s) 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for calibrating sensors, the method comprising the steps of:
    obtaining a two-dimensional image from a first sensor;
    obtaining three-dimensional point cloud data from a second sensor;
    determining a region of the two-dimensional image having a two-dimensional image edge;
    projecting a three-dimensional point cloud edge of the three-dimensional point cloud data onto the two-dimensional image edge;
    generating a plurality of rigid body transforms between the three-dimensional point cloud edge and the two-dimensional image edge, the plurality of rigid body transforms having bounds, wherein the bounds are based on a likelihood that a pixel of the two-dimensional image edge corresponds to a point of the three-dimensional point cloud edge;
    determining a lowest cost transform (T) of the plurality of rigid body transforms using a branch-and-bound optimization algorithm by iteratively evaluating the bounds of the plurality of rigid body transforms, the lowest cost transform having bounds indicating a greatest likelihood that the pixel of the two-dimensional image edge corresponds to the point of the three-dimensional point cloud edge;
    wherein the branch-and-bound optimization algorithm utilizes an edge based cost function that maximizes a probability ($p_i^{edge}$) that the three-dimensional point cloud edge ($P_{edge}$) relates to the two-dimensional image edge ($I_{edge}$) using the function:

$$| f(T; P_{edge}, I_{edge}) = \sum_{i=1}^{N} \log p(p_i^{edge} | I_{edge}; T);$$

and
    calibrating the first sensor with the second sensor using the lowest cost transform.

2. The method for calibrating sensors of claim 1, further comprising the step of bounding edge values of the region of the two-dimensional image using a sparse table data structure.

3. The method for calibrating sensors of claim 1, wherein the first sensor is a camera sensor and the second sensor is a light detection and ranging ("LIDAR") sensor.

4. The method for calibrating sensors of claim 3, wherein the LIDAR sensor and the camera sensor are mounted to a vehicle.

5. The method for calibrating sensors of claim 1, wherein the two-dimensional image edge of the two-dimensional image is defined by a color gradient.

6. The method for calibrating sensors of claim 1, wherein the three-dimensional point cloud edge is defined by at least one of an intensity gradient and a depth gradient.

7. The method for calibrating sensors of claim 1, wherein the branch-and-bound optimization algorithm utilizes an edge based cost function to determine the lowest cost transform of the plurality of rigid body transforms.

8. The method for calibrating sensors of claim 1, wherein the plurality of rigid body transforms are mathematical expressions that describe rotational differences between the three-dimensional point cloud edge and the two-dimensional image edge.

9. A sensor system comprising:
    one or more processors;
    a first sensor configured to obtain a two-dimensional image, the first sensor in communication with the one or more processors;

a second sensor configured to obtain three-dimensional point cloud data, the second sensor in communication with the one or more processors; and a memory device in communication with the one or more processors, the memory device storing a data collection module and a calibration module, wherein the data collection module having instructions when executed by the one or more processors causes the one or more processors to obtain a two-dimensional image from the first sensor and obtain three-dimensional point cloud data from a second sensor, wherein the calibration module having instructions when executed by the one or more processors causes the one or more processors to:

determine a region of the two-dimensional image having a two-dimensional image edge, project a three-dimensional point cloud edge of the three-dimensional point cloud data onto the two-dimensional image edge, generating a plurality of rigid body transforms between the three-dimensional point cloud edge and the two-dimensional image edge, the plurality of rigid body transforms having bounds, wherein the bounds are based on a likelihood that a pixel of the two-dimensional image edge corresponds to a point of the three-dimensional point cloud edge, determine a lowest cost transform of the plurality of rigid body transforms using a branch-and-bound optimization algorithm by iteratively evaluating the bounds of the plurality of rigid body transforms, the lowest cost transform having bounds indicating a greatest likelihood that the pixel of the two-dimensional image edge corresponds to the point of the three-dimensional point cloud edge, wherein the branch-and-bound optimization algorithm utilizes an edge based cost function that maximizes a probability ($p_i^{edge}$) that the three-dimensional point cloud edge ($P_{edge}$) relates to the two-dimensional image edge ($I_{edge}$) using the function:

$$|f(T; P_{edge}, I_{edge}) = \sum_{i=1}^{N} \log p(p_i^{edge} | I_{edge}; T);$$

and calibrate the first sensor with the second sensor using the lowest cost transform.

10. The sensor system of claim 9, wherein the calibration module having instructions when executed by the one or more processors further causes the one or more processors to bound edge values of the region of the two-dimensional image using a sparse table data structure.

11. The sensor system of claim 9, wherein the first sensor is a camera sensor and the second sensor is a light detection and ranging ("LIDAR") sensor.

12. The sensor system of claim 11, wherein the LIDAR sensor and the camera sensor are mounted to a vehicle.

13. The sensor system of claim 9, wherein the two-dimensional image edge of the two-dimensional image is defined by a color gradient.

14. The sensor system of claim 9, wherein the three-dimensional point cloud edge is defined by at least one of an intensity gradient and a depth gradient.

15. The sensor system of claim 9, wherein the branch-and-bound optimization algorithm utilizes an edge based cost function to determine the lowest cost transform of the plurality of rigid body transforms.

16. The sensor system of claim 9, wherein the plurality of rigid body transforms are mathematical expressions that describe rotational differences between the three-dimensional point cloud edge and the two-dimensional image edge.

17. A non-transitory computer-readable medium for calibrating sensors and including instructions that when executed by one or more processors cause one or more processors to:

obtain a two-dimensional image from a first sensor;

obtain three-dimensional point cloud data from a second sensor;

determine a region of the two-dimensional image having a two-dimensional image edge;

projecting a three-dimensional point cloud edge of the three-dimensional point cloud data onto the two-dimensional image edge;

generate a plurality of rigid body transforms between the three-dimensional point cloud edge and the two-dimensional image edge, the plurality of rigid body transforms having bounds, wherein the bounds are based on a likelihood that a pixel of the two-dimensional image edge corresponds to a point of the three-dimensional point cloud edge;

determine a lowest cost transform of the plurality of rigid body transforms using a branch-and-bound optimization algorithm by iteratively evaluating the bounds of the plurality of rigid body transforms, the lowest cost transform having bounds indicating a greatest likelihood that the pixel of the two-dimensional image edge corresponds to the point of the three-dimensional point cloud edge;

wherein the branch-and-bound optimization algorithm utilizes an edge based cost function that maximizes a probability ($p_i^{edge}$) that the three-dimensional point cloud edge ($P_{edge}$) relates to the two-dimensional image edge ($I_{edge}$) using the function:

$$|f(T; P_{edge}, I_{edge}) = \sum_{i=1}^{N} \log p(p_i^{edge} | I_{edge}; T);$$

and calibrate the first sensor with the second sensor using the lowest cost transform.

18. The non-transitory computer-readable medium of claim 17, further including instructions that when executed by one or more processors cause the one or more processors to bound edge values of the region of the two-dimensional image using a sparse table data structure.

19. The non-transitory computer-readable medium of claim 18, wherein the first sensor is a camera sensor and the second sensor is a light detection and ranging ("LIDAR") sensor.

20. The non-transitory computer-readable medium of claim 19, wherein the LIDAR sensor and the camera sensor are mounted to a vehicle.

* * * * *